US008028082B2

United States Patent
Hooda et al.

(10) Patent No.: US 8,028,082 B2
(45) Date of Patent: Sep. 27, 2011

(54) LOCATION BASED MULTICAST POLICIES

(75) Inventors: Sanjay Kumar Hooda, Sunnyvale, CA (US); Muninder Singh Sambi, Sunnyvale, CA (US); Sanjay Thyamagundalu, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 158 days.

(21) Appl. No.: 12/245,304

(22) Filed: Oct. 3, 2008

(65) Prior Publication Data

US 2010/0088425 A1 Apr. 8, 2010

(51) Int. Cl.
*G06F 15/16* (2006.01)
*H04W 24/00* (2009.01)

(52) U.S. Cl. ...... 709/233; 709/227; 709/231; 455/456.1

(58) Field of Classification Search .................. 709/227, 709/231, 233; 455/456.1, 440
See application file for complete search history.

(56) References Cited

U.S. PATENT DOCUMENTS

| 2004/0258051 | A1* | 12/2004 | Lee | 370/352 |
| 2005/0174955 | A1* | 8/2005 | Phillips et al. | 370/312 |
| 2005/0195813 | A1* | 9/2005 | Ambe et al. | 370/389 |
| 2005/0220131 | A1* | 10/2005 | Ginzburg et al. | 370/432 |
| 2007/0127475 | A1* | 6/2007 | Kuchibhotla et al. | 370/390 |

* cited by examiner

*Primary Examiner* — Philip Chea
(74) *Attorney, Agent, or Firm* — Tucker Ellis & West LLP

(57) ABSTRACT

Disclosed herein in an example embodiment is a multicast policy infrastructure that allows administrators to integrate location awareness for a particular multicast stream when it is being forwarded to an intended user. The infrastructure provides more flexibility by allowing multicast call admission control, access control, and other multicast policies to be based on the location or conditions where the host/user is receiving the multicast stream. A multicast policy can also provide additional mechanisms such as transcoding services, compression services, etc. based on the host/user location. As will be demonstrated in example embodiments herein, location awareness can include connectivity media (wired or wireless), physical location of user, and/or signal strength (and/or effective bandwidth).

12 Claims, 3 Drawing Sheets

LOCATION BASED MULTICAST POLICIES

TECHNICAL FIELD

The present disclosure relates generally to multicast streams.

BACKGROUND

Multicast is the delivery of information to a group of destinations simultaneously on a network. As receivers join a multicast group, a multicast distribution tree is created for the multicast group. Networks can be configured to provide multicast policies based on receiver IP address (e.g. using Internet Group Management Protocol "IGMP" filtering), multicast authentication and authorization (mAAA), and/or multicast Call Admission Control (mCAC). These policies, however, have many deficiencies.

BRIEF DESCRIPTION OF THE DRAWINGS

The accompanying drawings incorporated herein and forming a part of the specification illustrate the examples embodiments.

OVERVIEW OF EXAMPLE EMBODIMENTS

Figure 1:
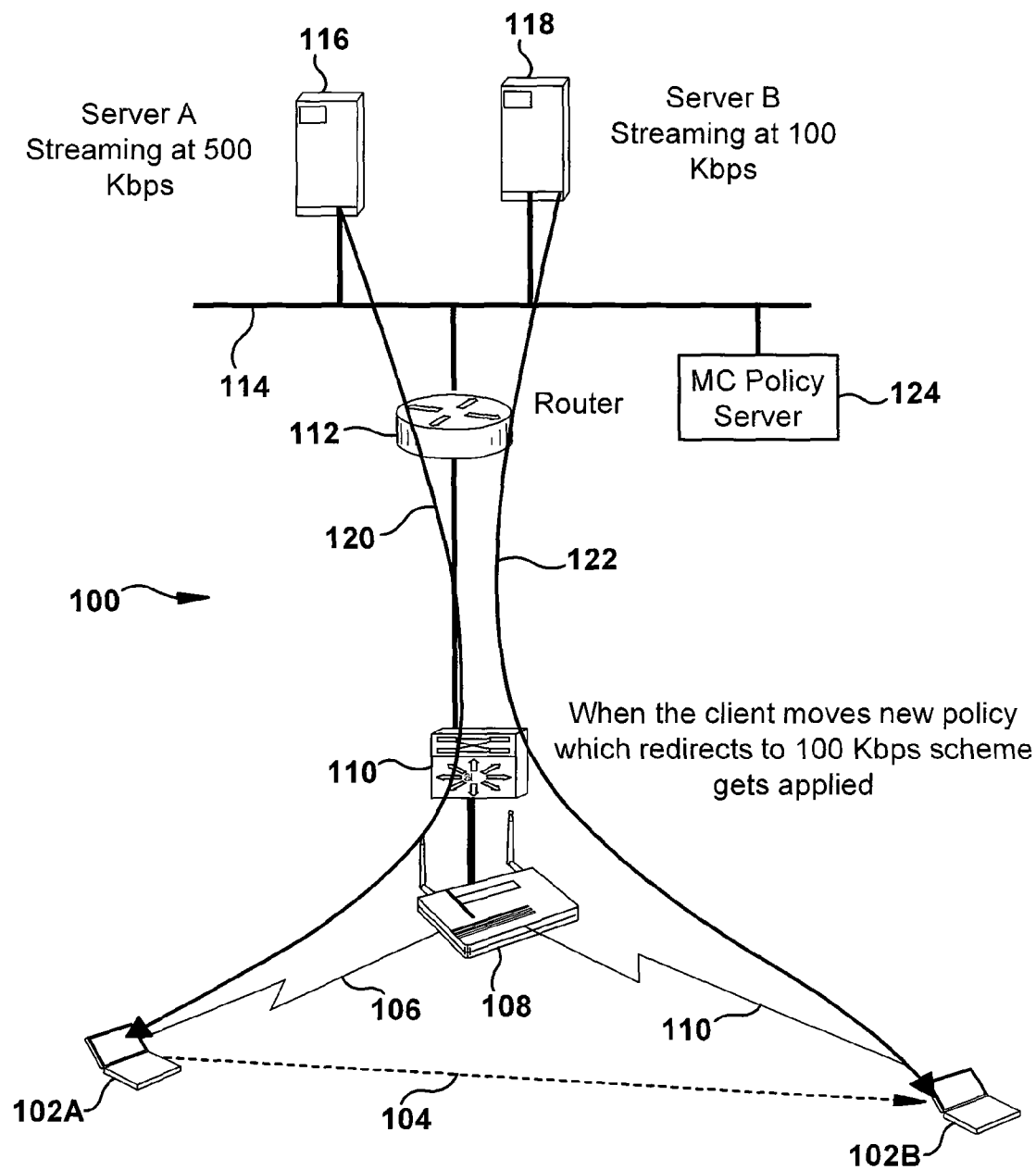
FIG. 1 is a block diagram illustrating an example of a network configured in accordance with an example embodiment.

The following presents a simplified overview of the example embodiments in order to provide a basic understanding of some aspects of the example embodiments. This overview is not an extensive overview of the example embodiments. It is intended to neither identify key or critical elements of the example embodiments nor to delineate the scope of the appended claims. Its sole purpose is to present some concepts of the example embodiments in a simplified form as a prelude to the more detailed description that is presented later.

In accordance with an example embodiment, there is disclosed herein an apparatus comprising logic in communication with a network. The logic is configured to receive a signal from a device requesting a multicast stream, the multicast stream being provided by a first source (such as a first multicast server) having a first data rate and a second source (for example a second multicast server) having a second data rate that is lower than the first data rate. The logic is further configured to determine whether to provide the multicast stream to the device based on a point of attachment of the device to the network. The logic is also configured to select one of a group consisting of the first source and the second source to provide the multicast stream to the device responsive to determining to provide the multicast stream to the device and on the point of attachment of the device to the network.

In accordance with an example embodiment, there is disclosed herein a method comprising receiving a request to receive a multicast stream from a device coupled to a network. A point of attachment of the device to the network is determined. The method further comprises determining whether to provide the multicast stream to the device based on the point of attachment. One of a group consisting of a first multicast server providing the multicast stream at a first data rate and a second multicast server providing the multicast stream at a second data rate is selected responsive to determining to provide the multicast stream to the device and on the point of attachment.

In accordance with an example embodiment, there is disclosed herein an apparatus comprising means for receiving a request from a device coupled to a network to receive a multicast stream, means for determining a maximum available bandwidth for the device to receive the multicast stream, and means for selecting between a plurality of multicast servers, each multicast server having an associated data rate to provide the multicast stream to the device. The means for selecting selects a selected multicast server from the plurality of multicast servers, the selected multicast server providing the multicast stream at a highest bandwidth that does not exceed the maximum available bandwidth for the device.

DESCRIPTION OF EXAMPLE EMBODIMENTS

This description provides examples not intended to limit the scope of the appended claims. The figures generally indicate the features of the examples, where it is to be understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Disclosed herein in an example embodiment is a multicast policy infrastructure that allows administrators to integrate location awareness for a particular multicast stream when it is being forwarded to an intended user. The infrastructure provides more flexibility by allowing multicast call admission control, access control, and other multicast policies to be based on the location or conditions where the host/user is receiving the multicast stream. A multicast policy can also provide additional mechanisms such as transcoding services, compression services, etc. based on the host/user location. As will be demonstrated in example embodiments herein, location awareness can include connectivity media (wired or wireless), physical location of user, and/or signal strength (and/or effective bandwidth).

For example, based on the media over which the user is connecting to the network, different policies for a multicast stream can be applied to a particular user. Options include assigning a different level of bandwidth allocation/redirecting to a different bandwidth stream or totally disallowing the access to a stream. For example: an enterprise network policy can be instituted that does not allow users to connect to a particular corporate video stream (e.g. company meeting) when connecting through a wireless device. Thus, even though a user is authenticated and will be able to access other multicast streams, access to the particular corporate video stream (mapped to a Multicast group) will not be allowed for the user. The same user, however, will be able to access this particular multicast group when connecting from a wired interface.

In an example embodiment, a specific multicast policy can be applied to a particular user based on the physical location from where the user is connected. For example, this might include redirecting to a nearby source, such as if the user is connecting from a different country, it might be desirable that the user either has access to a low bandwidth stream or might even be blocked from accessing the stream. The policy can be different for each user to provide flexibility.

In an example embodiment, a multicast policy can be based on the signal strength and/or effective bandwidth for the user (for example, while the user is connected via a wireless connection). For example, a user may be moving, causing the user's signal strength to decrease such that the effective bandwidth is being reduced. This information can be fed back into the policy infrastructure, and the user can be redirected to a different stream or a different compression algorithm can be negotiated with the user's device so that the appropriate Service Level Agreement (SLA) can be provided to the user so that the user receives an uninterrupted stream without loss of packets.

FIG. 1 is a block diagram illustrating an example of a network 100 configured in accordance with an example embodiment. A mobile device is initially located at a first position 102A and moves along path 104 to a second position 102B. While at first position 102A, the device is in wireless communication, indicated by signal 106 with access point 108. While at second position 102B, the device is in wireless communication with access point 108 as indicated by signal 110.

Access point 108 is coupled to switch 111, which is coupled to router 112. Router 112 is coupled to a distribution network 114. Disposed on distribution network 114 are servers 116, 118 that provide a multicast stream.

In the illustrated example, server 116 provides the stream at 500 Kbps (Kilobytes per second) and server 118 provides the stream at 100 Kbps. In the illustrated example, while the device is at first position 102A, the device receives the multicast stream from server 116 as indicated by path 120. While at second position 102B, the device receives the multicast stream from server 118 as indicated by path 122.

Figure 2:
FIG. 2 illustrates an example of a device configured for multicast stream assignment.

Logic coupled to network 100 is employed to decide from which server 116, 118 the multicast stream should be provided or whether the stream should be provided at all. "Logic," as used herein, includes but is not limited to hardware, firmware, software combined with hardware, software combined with firmware, and/or combinations of each to perform a function(s) or an action(s) and/or to cause a function or action from another component. For example, based on a desired application or need, logic may include a software-controlled microprocessor, discrete logic such as an application specific integrated circuit (ASIC), a programmable/programmed logic device, memory device containing instructions, or the like, or combinational logic embodied in hardware. The logic for implementing a multicast policy may be co-located within any infrastructure node coupled to network 100, including but not limited to access point 108, switch 111, router 112, server 116, and/or server 118; or the logic for implementing multicast policy may be implemented on a standalone device such as server 124. For example, referring to FIG. 2, with continued reference to FIG. 1, a device 200 (which as noted herein supra may be located in any one or more of access point 108, switch 111, router 112, server 116, server 124) may suitably comprise multicast policy logic 202 for implementing the functionality described herein and a communication link 204 for sending/receiving data and/or communicating from which source multicast streams are to be provided to devices. For example, multicast policy logic 202 may be implemented by a processor running software (see for example FIG. 3 herein), which is linked to a data bus via communication link 204 for obtaining location data for the endpoint requesting a multicast stream. Multicast policy logic 202 can then determine the appropriate source, e.g. server 116, 118, to provide the stream to the endpoint requesting the stream.

In an example embodiment, multicast policy logic 202 is configured to receive a signal from a device requesting a multicast stream. Multicast policy logic 202 is configured to determine whether to provide the multicast stream to the device based on a point of attachment of the device to the network. For example, if the endpoint is in a foreign country or connecting to a network remotely, multicast policy logic 202 may deny the request for the multicast stream. As another example, multicast policy logic 202 may allow the request if the endpoint is connected to a network via a wired port but may deny the request if the device is connected via a wireless connection. Moreover, if multicast logic 202 allows a request for a multicast stream, multicast policy logic 202 selects a server, e.g. one of servers 116, 118 in the example illustrated in FIG. 1, to provide the multicast stream. As another example, one group of users may be allowed to access a multicast stream from location 102A but not from location 102B, whereas a second group of users may be allowed to access the multicast stream from both locations 102A and 102B.

In an example embodiment, multicast policy logic 202 determines whether to provide the multicast stream based on a combination of user data associated with the device and a physical location of the point of attachment. For example, a first user may be allowed to access the multicast stream using a device at a certain point of attachment, where another user may be prohibited from accessing the multicast stream using the same device at the same certain point of attachment.

In an example embodiment, multicast policy logic 202 selects multicast server 116 to provide the multicast stream responsive to determining the point of attachment is a wired connection and selects the second multicast server 118 to provide the multicast stream responsive to determining the point of attachment is a wireless connection.

In an example embodiment, multicast policy logic 202 selects multicast server 116 to provide the multicast stream responsive to determining the point of attachment (e.g. signal 106 to access point 108) is a wireless connection with sufficient bandwidth for the first data rate. Otherwise, multicast policy logic 202 selects multicast server 118. In addition, multicast policy logic 202 can change the server providing the multicast stream dynamically. For example, as the endpoint is traveling along path 104 from position 102A to position 102B, if multicast policy logic 202 determines that the endpoint can no longer receive the stream at the higher data rate (which may be due to distance from access point 108, signal strength, signal to noise ratio, interference, etc.), multicast policy logic 202 can then switch the endpoint to server 118. If the endpoint returns to position 102A (or due to other circumstances the endpoint can again receive the stream at the higher data rate), multicast policy logic 202 switches the endpoint to server 116.

The thresholds for determining which server 116, 118 provides the multicast stream can be selected by a network administrator. For example, a single threshold can be used (e.g. above the threshold server 116, below the threshold 118), or multiple thresholds can be used to provide some hysteresis to prevent excessive switching. For example, a first threshold can be used to determine when to provide the multicast stream from server 116. A second threshold that is below the first threshold can be used to determine when to provide the multicast stream from the server 116.

In an example embodiment, multicast policy logic 202 is configured to select the multicast server 118 to provide the multicast stream responsive to determining the second data rate is sufficient for the endpoint. For example, if the multicast stream is a video stream and the endpoint (device) is only capable of producing an image at a low resolution, multicast policy logic 202 may select multicast server 118 to provide the stream even though the bandwidth is sufficient for providing a higher resolution stream, which the endpoint cannot display.

Figure 3:
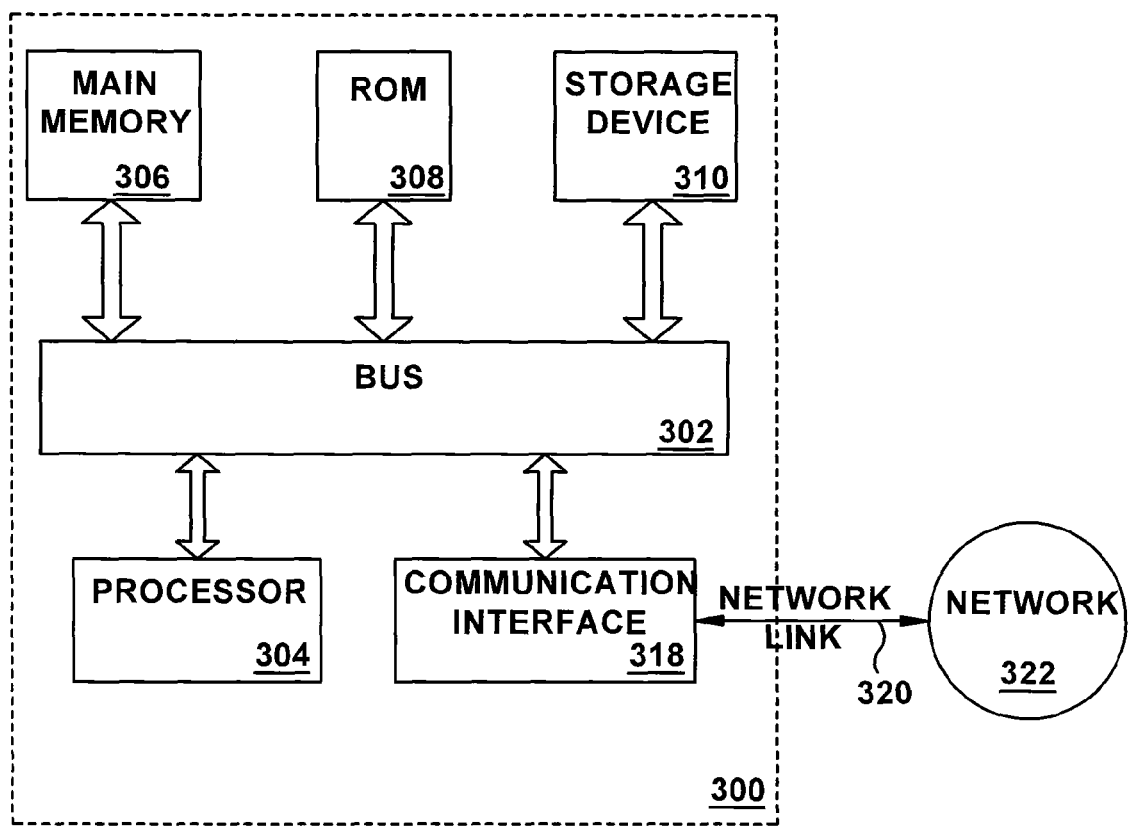
FIG. 3 illustrates an example of a computer system upon which an example embodiment may be implemented.

FIG. 3 is a block diagram that illustrates an example of a computer system 300, upon which an example embodiment may be implemented. Computer system 300 includes a bus 302 or other communication mechanism for communicating information and a processor 304 coupled with bus 302 for processing information. Computer system 300 also includes a main memory 306, such as random access memory (RAM) or other dynamic storage device, coupled to bus 302 for storing information and instructions to be executed by processor 304. Main memory 306 also may be used for storing a temporary variable or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

An aspect of the example embodiment is related to the use of computer system 300 for implementing location-based multicast policies. According to an example embodiment, implementing location-based multicast policies is provided by computer system 300 in response to processor 304 executing one or more sequences of one or more instructions contained in main memory 306. Such instructions may be read into main memory 306 from another computer-readable medium, such as storage device 310. Execution of the sequence of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement an example embodiment. Thus, embodiments described herein are not limited to any specific combination of hardware circuitry and software.

The term "computer-readable medium," as used herein, refers to any medium that participates in providing instructions to processor 304 for execution. Such a medium may take many forms, including but not limited to non-volatile media, volatile media, and transmission media. Non-volatile media include, for example, optical or magnetic disks such as storage device 310. Volatile media include dynamic memory such as main memory 306. Transmission media include coaxial cables, copper wire, and fiber optics, including the wires that comprise bus 302. Transmission media can also take the form of acoustic or light waves such as those generated during radio frequency (RF) and infrared (IR) data communications. Common forms of computer-readable media include, for example, floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 304 for execution. For example, the instructions may initially be borne on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling computer system 300 to a network link 320 that is connected to a local network 322. This would allow computer system 300 to acquire location data for an endpoint requesting a multicast stream and also enables computer system 300 to communicate whether the multicast stream will be provided and, if so, the source of the multicast stream.

Figure 4:
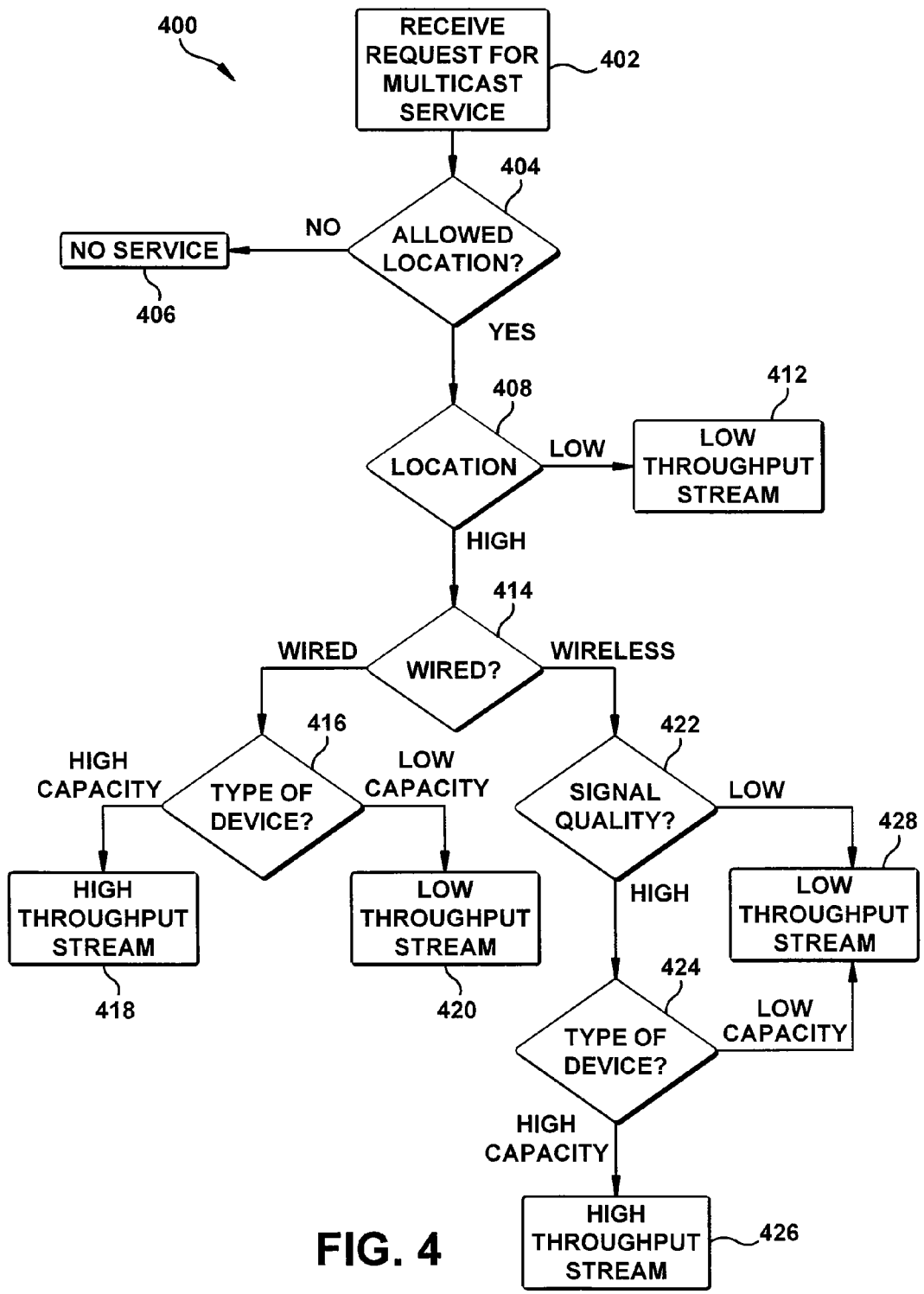
FIG. 4 is a block diagram illustrating an example methodology.

In view of the foregoing structural and functional features described above, a methodology in accordance with an example embodiment will be better appreciated with reference to FIG. 4. While, for purposes of simplicity of explanation, the methodology of FIG. 4 is shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement a methodology in accordance with an aspect the example embodiment. The methodology described herein is suitably adapted to be implemented in hardware, software, or a combination thereof.

FIG. 4 is a block diagram illustrating an example methodology 400 for providing a location-based multicast policy. At 402, a request for multicast service is received. The request may be received by an access point, router switch, server, or any suitable node coupled to a network.

At 404, the point of attachment of the device to the network (where and/or what type of connection, such as the physical media) is determined. This enables methodology 400 to determine whether the user and/or device are at an allowed location. For example, a multicast stream may be limited to only wired network connections; thus, if a user connects via a wireless connection, the request for multicast service would be denied. As another example, a user or group of users can be limited to certain locations. For example, a user may be restricted if accessing the network from a remote location. If the user or member of the group is not at an allowed location, the request for the multicast service is denied.

If the user/device is not at an allowed location (NO), the request is denied (No service) as illustrated at 406. If the user/device is at an allowed location (YES), at 408, the location of the point of attachment is assessed to determine whether a type of connection has been defined for that location. For example, some locations may be assigned to low throughput connections (for example, a connection from a foreign network). If at 408 the location of the point of attachment is defined as a low throughput location (LOW), at 412 the device is coupled to a low throughput version of the stream. If at 408, the location of the point of attachment is defined as a high throughput location (HIGH), additional policies may determine whether a high throughput or low throughput stream should be employed to provide the multicast stream. For example, even though a wireless device is at a "HIGH" throughput location, if it is using a wireless connection with poor signal quality it may still be provided with a low throughput stream, as illustrated below.

If at 414 it is determined that the receiver of the multicast stream is connected via a wired connection (WIRED), at 416 the type of device is determined. For example, a determination may be made as to whether the device is equipped to receive a high data rate stream or whether the device can suitably employ a high data rate stream (for example, if receiving an audio, video, or audiovisual signal, can the device use the highest resolution available or what is the highest resolution the device can use). If the device can receive a high throughput stream (HIGH CAPACITY), at 418 the device is connected to the multicast stream at a high throughput; otherwise, at 420 the device is connected to the multicast stream using a low throughput connection. For example, if two servers are providing the multicast stream, the first server providing the stream at a higher data rate than the second server, at 418 the device is connected to the first server and at 420 the device is connected to the second server.

If at 414 it is determined that the connection is wireless (WIRELESS), at 422 the signal quality is assessed. The signal quality may be assessed employing any desired signal characteristic, including but not limited to Bit Error Rate (BER), Signal to Noise Ratio (SNR), Received Signal Strength Indication (RSSI), bandwidth, and/or throughput. If the signal quality at 422 is determined to be low (LOW; for example, if two streams are available and the signal quality is not sufficient to handle the higher throughput stream, then the signal quality would be considered low), at 428 a low throughput stream is used to provide the multicast stream.

If at 422 it is determined that the signal quality is capable of receiving a high throughput stream (HIGH), at 424 the type of device is determined. For example, a determination may be made as to whether the device is equipped to receive a high data rate stream or whether the device can suitably employ a high data rate stream (for example, if receiving an audio, video, or audiovisual signal, can the device use the highest resolution available or what is the highest resolution the device can use). If the device can receive a high throughput stream (HIGH CAPACITY), at 426 the device is connected to the multicast stream at a high throughput; otherwise, at 428 the device is connected to the multicast stream using a low throughput connection.

In an example embodiment, block 422 is repeated at predetermined intervals to determine whether the signal quality has deteriorated or improved. For example, if the device is receiving the multicast steam via a high throughput stream and the signal quality deteriorates below a first predetermined threshold, the source of the multicast stream can be switched from a high throughput stream (426) to a lower throughput stream (428). As another example, if the signal quality improves above a second predetermined threshold, the source of the multicast stream can be switched from a low throughput stream (428) to a high throughput stream (426), assuming the type of device receiving the multicast stream can handle a high throughput stream.

The example embodiments described herein illustrate two (e.g. low throughput and high throughput) sources for a multicast stream. This was done merely for ease of illustration, as those skilled in the art should readily appreciate that the principles described herein can be applied to networks with any physically realizable number of sources.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications, and variations that fall within the spirit and scope of the appended claims interpreted in accordance with the breadth to which they are fairly, legally, and equitably entitled.

The invention claimed is:

1. An apparatus, comprising:
a processor in communication with an associated network;
wherein the processor is configured to execute logic of the apparatus and to receive a signal from an associated device requesting a multicast stream, the multicast stream being provided by a first associated source of the multicast stream coupled with the associated network having a first data rate and a second associated source of the multicast stream coupled with the associated network having a second data rate that is lower than the first data rate;
wherein the processor is configured to execute the logic to determine whether to provide the multicast stream to the associated device based on a combination of user data associated with the associated device and a physical location of a point of attachment of the associated device to the associated network;
wherein the processor is configured to execute the logic to determine a connection type of the point of attachment of the associated device at the physical location;
wherein the processor is configured to execute the logic to dynamically select one of a group consisting of the first associated source of the multicast stream and the second associated source of the multicast stream to provide the multicast stream to the associated device based upon a determination to provide the multicast stream to the associated device and based on the connection type of the point of attachment at the physical location of the associated device to the associated network;
wherein the processor selects the first source to provide the multicast stream responsive to determining the point of attachment of the associated device has sufficient bandwidth for the first data rate; and
wherein the processor subsequently switches the source of the multicast stream for the associated device to the second source responsive the bandwidth at the point of attachment is no longer sufficient to provide the multicast stream at the first data rate.

2. The apparatus set forth in claim 1, wherein the processor is configured to execute the logic to determine whether to provide the multicast stream to the associated device based on whether the point of attachment is a wired connection or a wireless connection.

3. The apparatus set forth in claim 1, wherein the processor is configured to execute the logic to select the first source to provide the multicast stream responsive to determining the point of attachment is a wired connection and to select the second source to provide the multicast stream responsive to determining the point of attachment is a wireless connection.

4. The apparatus set forth in claim 1, wherein the processor is configured to execute the logic responsive to determining that the bandwidth of the point of attachment for the associated device has increased sufficiently to provide the multicast stream at the first data rate to dynamically switch the source of the multicast stream provided to the associated device to the first associated source of the multicast stream to provide the multicast stream.

5. The apparatus set forth in claim 1, wherein the processor is configured to execute the logic to select the second source of the multicast stream to provide the multicast stream responsive to determining the second data rate is sufficient for the associated device.

6. A method, comprising:
- receiving a request to receive a multicast stream from an associated device coupled to an associated network;
- determining a point of attachment of the associated device to the associated network;
- determining a user associated with the associated device;
- determining a physical location of the user associated with the associated device;
- determining by a processor executing logic whether to provide the multicast stream to the associated device based on the point of attachment and the physical location of the associated user;
- determining by the processor executing the logic a connection type of the point of attachment of the associated device;
- dynamically selecting by the processor executing the logic one of a group consisting of a first source providing the multicast stream at a first data rate and a second source providing the multicast stream at a second data rate, wherein the second data rate is less than the first data rate, based upon a determination to provide the multicast stream to the device and based on the point of attachment of the associated device to the associated network;
- wherein the processor selects the first source responsive to determining the bandwidth at the attachment is sufficient to provide the multicast stream at the first data rate; and
- wherein the processor dynamically selects the second source upon determining the bandwidth at the point of attachment is no longer sufficient to provide the multicast stream at the first data rate.

7. The method of claim 6, further comprising determining whether the point of attachment is a wired or a wireless connection.

8. The method of claim 7, wherein the first source is selected responsive to determining the point of attachment is a wired connection and selecting the second source responsive to determining the point of attachment is a wireless connection.

9. The method of claim 6,
- wherein the determining whether to provide the multicast stream further comprises determining whether the user is allowed to receive the multicast stream at the physical location.

10. The method of claim 6, further comprising determining while the multicast stream is being provided by the second source that the maximum bandwidth for the associated device has increased sufficiently to provide the multicast stream at the first data rate; and
- dynamically selecting the first source to provide the multicast stream responsive to determining the bandwidth at the point of attachment for the associated device has increased sufficiently to provide the multicast stream at the first data rate.

11. The method of claim 6, further comprising determining a minimum bandwidth requirement for the associated device;
- wherein the selecting comprises selecting the second source responsive to determining the minimum bandwidth requirement is lower than the first data rate and higher than the second data rate.

12. Logic encoded in one or more non-transitory computer readable medium for execution and when executed operable to:
- receive a request from an associated device coupled to an associated network to receive a multicast stream;
- determining a physical location of a user associated with the associated device responsive to receiving the request to receive the multicast stream;
- dynamically determine a maximum available bandwidth at a point of connection for the associated device to receive the multicast stream;
- dynamically select between a plurality of multicast sources, each multicast source having an associated multicast server operating at a data rate to provide the multicast stream to the associated device by the associated network;
- wherein the selecting between the plurality of multicast sources comprises selecting an associated selected multicast server from the plurality of multicast servers, the selected multicast server providing the multicast stream at a highest bandwidth that does not exceed the maximum available bandwidth for the device in accordance with the determined physical location;
- wherein a first of the plurality of multicast sources having a first data rate is selected responsive to determining the first data rate is a maximum data rate supported at a first point of attachment; and
- wherein the source of the multicast stream is dynamically switched to a second of the plurality of multicast sources having a second data rate that is greater than the first data rate upon determining that the point of attachment has changed to a second point of attachment, and that the second point of attachment is capable of supporting the second data rate.

* * * * *